United States Patent [19]

Steiner

[11] 4,200,570
[45] Apr. 29, 1980

[54] 5-HALO-2-TRIFLUOROMETHYL-PHENYLAZO-PYRAZOLONES

[75] Inventor: Russell I. Steiner, Reading, Pa.

[73] Assignee: Crompton & Knowles Corporation, New York, N.Y.

[21] Appl. No.: 821,730

[22] Filed: Aug. 4, 1977

[51] Int. Cl.$^2$ .............. C09B 29/38; C09D 11/00; D06P 1/18; D06P 3/54
[52] U.S. Cl. .............. 260/163; 106/14.5; 106/22; 260/208; 427/144; 428/488
[58] Field of Search .............. 260/163, 162

[56] References Cited

U.S. PATENT DOCUMENTS 1,809,030  6/1931  Geller .............. 260/163

FOREIGN PATENT DOCUMENTS 2347124  3/1974  Fed. Rep. of Germany .............. 260/163
305009   4/1955  Switzerland .............. 260/163
305010   4/1955  Switzerland .............. 260/163

Primary Examiner—Floyd D. Higel
Attorney, Agent, or Firm—William H. Elliott, Jr.

[57] ABSTRACT

New yellow azo pyrazolone compounds having the structure

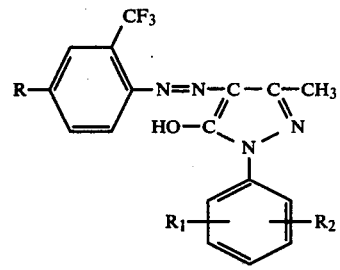

wherein R is halogen and $R_1$ and $R_2$ are hydrogen, lower alkyl or halogen. The compounds are useful as yellow dyes in heat transfer printing of synthetic fabrics.

6 Claims, No Drawings

5-HALO-2-TRIFLUOROMETHYLPHENYLAZO-PYRAZOLONES

This invention relates to new yellow pyrazolone compounds that are useful in heat transfer printing of synthetic textile fabrics, to a method of making the new pyrazolone compounds, to transfer sheets carrying such compounds and adapted for use in heat transfer printing of textile fabrics, to inks that are useful in making such transfer sheets, to an improved process using said compound and said transfer sheets for the heat transfer printing of synthetic fabrics, and especially polyester fabrics and to the printed or dyed fabrics produced thereby.

The new yellow azo-pyrazolone compounds of this invention have the following structure (hereinafter Structure I):

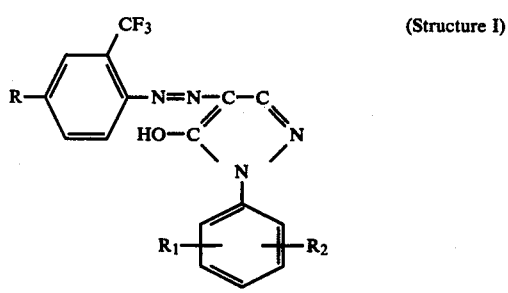
(Structure I)

wherein R is halogen (especially fluorine, bromine and chlorine) and $R_1$ and $R_2$ independently of one another are hydrogen, lower alkyl (especially methyl, ethyl, propyl and butyl), or halogen (especially bromine and chlorine).

The azo-pyrazolone compounds of this invention are made by diazotizing a 2-amino-5-halobenzotriflouride and coupling the diazonium salt to a pyrazolone having the structural formula:

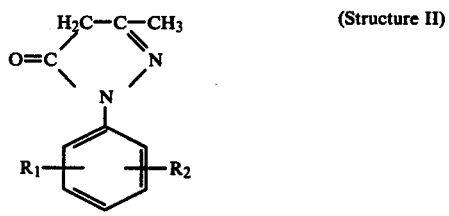
(Structure II)

wherein $R_1$ and $R_2$ are independent of one another, hydrogen, lower alkyl or halogen.

For reasons of economy I prefer to use 2-amino-5-chlorobenzotrifluoride as the diazo component; the analogous fluoro and bromo derivatives are more expensive but can be used for purposes of this invention.

The couplers that are suitable for use in accordance with this invention include:
1-phenyl-3-methyl-5-pyrazolone,
1-(2-methylphenyl)-3-methyl-5-pyrazolone,
1-(3-methylphenyl)-3-methyl-5-pyrazolone,
1-(4-methylphenyl)-3-methyl-5-pyrazolone,
1-(2-chlorophenyl)-3-methyl-5-pyrazolone,
1-(3-chlorophenyl)-3-methyl-5-pyrazolone, 1-(4-chlorophenyl)-3-methyl-5-pyrazolone,
1(2,5-dichlorophenyl)3-methyl-5-pyrazolone and
1-(3,4-dichlorophenyl)-3-methyl-5-pyrazolone.

In lieu of the specific methyl phenyl compounds identified above the analogous lower alkyl derivatives of these compounds such as ethyl, propyl and butyl can also be employed for purposes of this invention. Similarly in lieu of the specific chlorophenyl compounds identified above, the analogous halo derivatives such as bromo derivatives may also be used for purposes of this invention.

The new compounds prepared in accordance with the invention have a unique combination of properties and dyeing characteristics when used in the heat transfer printing of synthetic textile fabrics. They impart clear bright yellow colors having good wet fastness and outstanding light fastness properties and are especially suitable for use in heat transfer printing applications where a solid color is to be applied and deep penetration of the dye into the fiber is desired so as to minimize the color contrast between the printed face of the fabric and the unprinted back of the fabric.

Various techniques (such as melt transfer and wet transfer) have heretofore been used to produce transfer prints but they have not been widely utilized in commercial fabric printing operations. In the late 1950's the French firm, Filatures Prouvost Masurel et Cie, pioneered the development of a dry transfer printing process, referred to variously as the vapor-phase process, the dry heat process or the sublimation process; the use of this process is in a stage of continuing rapid growth and it is described in great detail in published literature and patents—e.g., British Specification No. 1,189,026 discloses an early embodiment of the process.

In this application the terms "thermal transfer process" and "heat transfer process" will be used interchangeably, but shall only refer to the sublimation or vapor-phase process of printing or dyeing synthetic textiles wherein the textiles are colored with water-insoluble dyestuffs that undergo sublimation at temperatures below that at which the physical integrity of the textile is impaired. The dyeing or printing is carried out by printing a substrate (usually paper or a sheet of non-textile material) in an all-over or discontinuous pattern with an ink that contains the sublimable dyestuff. The printed substrate and the textile to be dyed or printed are brought into contact under controlled conditions of time, temperature and pressure whereby the dye on the substrate is caused to sublime or be vaporized onto the surface of the textile to penetrate into the fibers and to be entrained therein. Thereafter, the substrate and the dyed or printed textile are separated.

Also, as used herein the following terms shall be deemed to have the following meanings:

(a) "Heat transfer prints" shall be construed as referring to dyeings or pattern effects produced by the heat transfer process.

(b) "Pattern effects" shall be construed as referring to continuous (allover) effects as well as discontinuous (localized) effects.

(c) "Textile" shall be construed as referring to fabric (in web form or as piece goods), to nonwoven materials and to finished articles made from such products.

(d) "Polyester" shall be construed as referring to textiles made entirely or predominantly of polyester fibers.

(e) "Transfer sheet" shall be construed as referring to a non-textile substrate (normally, but not necessarily, paper) in sheet, roll or web form having a pattern effect printed thereon with a dried film of an ink formulation adapted for use in the heat transfer printing of synthetic textiles.

(f) "Compatible dyestuffs" and "compatible sublimable dyestuffs" shall be construed as meaning water insoluble disperse dyes or pigments or flourescent brightners that have essentially the same sublimability and thermal transfer characteristics, desirably they should be of about the same energy level and transfer at about the same rate under the same operating conditions.

No single sublimable disperse dyestuff or color of any hue posesses the combination of color characteristics, working properties and performance properties such that it has universal utility and can be effectively used in all types of thermal transfer printing applications on all kinds of synthetic fibers. From the standpoint of commerical acceptability, among the most significant properties are the strength and hue developed on the particular fiber undergoing the printing or dyeing operation; if the dyestuff will not develop the particular hue and depth desired by the designer or stylist, the dyestuff simply will not sell. The extent to which the sublimed dyestuff will penetrate the fabric is another factor that determines whether or not a given dyestuff can be utilized in a given heat transfer printing application. Thus where the sublimed dye penetrates deeply and rapidly into the fibers the dye cannot be used to produce sharp discontinuous or localized effects because feathering occurs at the edges of the localized pattern; such dyes however, if otherwise suitable, can be used to make heat transfer prints in solid colors. Unfortunately many of the sublimable dyestuffs that penetrate deeply and rapidly also have a tendency to "blow" through the fabric and considerable quantities of the dye are not retained by the fabric thus making for inefficient color utilization. Efficient deep penetration of the sublimed dyestuff is an important factor and desirable capability in the heat transfer printing of pile fabrics if tipping is to be avoided. Deep penetration is also important in the heat transfer printing of solid colors on woven fabrics where the design or end use considerations call for minimizing the color contrast between the printed face of the fabric and the back thereof or to reduce "grin through"—i.e. whitening or color change that becomes visible as the fabric weave is stretched or distorted.

Moreover, as is the case in all commercial dyeing the fastness properties to light and wet tratments is highly important.

In German OLS No. 1,711,812 it has been suggested to use a dye known as C.I. Solvent Yellow 16 to impart yellow color to polyester fabrics by the heat transfer process. Solvent Yellow 16 has the structure:

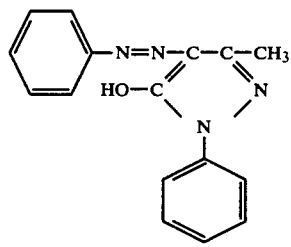

(Structure III)

However, the dyeings made therewith on polyester fabrics exhibit rather poor light fastness in that thermal transfer prints at a 4% depth breakdown quickly in the Fade-O-Meter showing a rating of 4–5 at 20 hours, 3 at 40 hours and 2 at 60 hours. In addition, Solvent Yellow 16 is of low tinctorial strength and although it exhibits a high degree of penetration into polyester, and transfer prints develop about one-half of the color depth on the back as compared with the color on the face, nevertheless, from a total color utilization standpoint, it cannot be efficiently used for making solid color heat transfer prints because a considerable portion of the color "blows" through the fabric in the heat transfer operation. In transfer printing multiply sandwich of polyester fabrics; considerable color will be found on the face of the 3rd ply and even the back of the 3rd ply is slightly stained.

Accordingly, it is an object of this invention to provide a new group of sublimable azo pyrazolone compounds or dyestuffs that can be used to impart deeply penetrating yellow tones of superior light fastness to polyester fibers by the thermal transfer printing process.

It is a further object of this invention to provide a process for making the new compounds.

It is another object of the present invention to provide an improved thermal transfer printing process for economically and efficiently using the new compounds to impart deeply penetrating solid yellow hues of outstanding lightfastness to polyester and other synthetics.

It is another object of this invention to provide improved thermal transfer sheets incorporating said new dyestuffs for use in the aforesaid improved thermal transfer process.

It is yet another object of the invention to provide printing inks incorporating said new dyestuffs that are useful in making the aforesaid transfer sheets.

It is a still further object of this invention to provide yellow heat transfer dyed or printed textiles of synthetic fiber—especially polyester—having outstanding lightfast properties.

Other objects and advantages of the invention will be apparent from the description and the appended examples.

These object and advantages are obtained in accordance with this invention by the aforementioned Structure I compounds and the use thereof as sublimable dyestuffs in the heat transfer printing of synthetic fabrics.

The Structure I compounds are water-insoluble, and sublime and transfer readily at low energy levels. They exhibit adequate color strength and uniform build-up properties and can be used for pastel shades. They penetrate deeply into woven polyester fabrics at the thermal transfer operating conditions comparable to that provided by 30-second contact at 400° F. In such cases the color developed on the back is of medium depth relative to the face, thus minimizing contrast between the printed face and its printed back of the fabric. Moreover, this effect is obtained in a rather efficient manner since relatively small amounts of color "blow" through the fabric. The resulting prints exhibit very good wet fastness properties and superior lightfastness.

The Structure I compounds are also useful as sublimable dyestuffs for thermal transfer printing of acrylic pile fabrics—showing outstanding penetration with good color efficiency.

The Structure I dyes are particularly suitable for use in mixtures with other compatible sublimable dyestuffs—of which many are presently commercially available—to provide compound color blends for producing desired a deep penetrating compound color in solid or all over patterns.

The following examples will serve to illustrate the preparation and use of the compounds of this invention. In these examples, unless otherwise indicated, parts are by weight, temperatures are given in degrees Centigrade and percentages are by weight.

EXAMPLE 1

A mixture of 200 g. (108 ml) of 93% $H_2SO_4$ and 100.2 g. (54 ml) of 40% nitrosyl sulfuric acid solution was cooled to 25°–30° C. and thereafter 58.6 g. (0.3 gram mols) 2-amino-5-chlorobenzotrifluoride was fed dropwise thereto. Upon completion of diazotization ⅓ of the diazonium salt solution was used to couple with the pyrazolone as follows:

50 grams $Na_2CO_3$ was dissolved in 200 ml water, and 20.85 g. of 1-(4 chlorophenyl)-3-methyl-5-pyrazolone was added. The mass was heated to 50° C. to dissolve the pyrazolone, filtered to clarify, cooled to 0° C. by addition of ice, and the diazonium salt solution at 0°–5° C. was added thereto and held at pH 9.4–9.6 by addition of $Na_2CO_3$. After stirring overnight the dye was isolated by filtering, washed with water till free of alkali (as tested with Brilliant Yellow indicator paper), dried and recovered 40.4 g. of water insoluble yellow powder—m.p. 199.5°–201° C. having the structural formula:

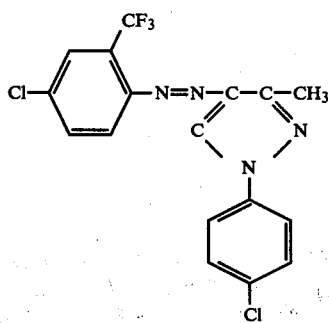

(Structure IV)

In use in the thermal transfer process, the new yellow pyrazolone dye is dispersed in an ink base formulation including a vehicle (or either the aqueous or solvent type) and a film-forming binder adapted to the type of printing operation to be used in printing the transfer sheet—i.e. gravure, flexographic, lithographic offset or rotory screen —and printed on the substrate—usually a paper sheet or web. The problems incident to paper selection and to the manufacture and formulation of ink bases (including the selection of appropriate vehicles, solvents, binders, thinners, etc. used to make the ink base) that are suitable for use in the printing of the heat transfer substrates by the various printing techniques are all well understood in the art and no special or unique problems arise by virtue of the use of the specified pyrazolone dyes in such formulations.

The dyes in the ink formulation used in producing the substrate should preferably be free of dispersants and ground to a particle size that can be readily dispersed in the vehicle—preferably less than 3 microns in size. When used in ink systems with other compatible sublimable dyes or optical brighteners, they, too, should preferably be dispersant free and have the same order of particle size as the specified pyrazolone dye component.

Example 2 below illustrates various aspects of the invention, namely: (a) an ink formulation (a solvent type vehicle—for gravure printing); (b) the transfer sheet and (c) the improved heat transfer process.

EXAMPLE 2

(a) A gravure ink with a viscosity of 22 seconds on a #2 Zahn cup, was made by blending 20 parts of the yellow compound of Example 1 with 80 parts of an ink base (composed of 8 parts ethyl cellulose as the binder and 72 parts of a vehicle (80% by weight ethanol and 20% by weight toluol) and grinding the ingredients in a shot mill to a particle size under 3 microns.

(b) To make the transfer sheet, the resulting ink diluted to give a 4% dye concentration and was printed on a standard gravure base paper stock using a Geiger laboratory gravure proofing press with an engraved cylinder at 150 cells/linear inch. The printed transfer sheet was allowed to dry.

(c) An undyed piece of 100% texturized polyester fabric was placed on the printed face of the dried transfer sheet. The composite was positioned between two platens with the unprinted side of the transfer sheet in contact with the heated surface of the platten and was under conventional heat transfer operating pressure and heated for 30 seconds at 205° C. Thereafter the fabric and used transfer sheet were separated. The polyester fabric was dyed on its face in a hue of good tinctorial strength and excellent fastness properties and the color penetrated the fabric so that the back was colored in a yellow hue of about ¼ the depth of color on the face thereby minimizing the contrast between the printed face and the back of the fabric.

All fastness tests were conducted in accordance with AATCC Standard Test Methods as follows:

Light Fastness—Xenon-AATCC Test Method 16E-1971 and Fade-O-Meter-AATCC Test Method 16A-1971.

Wash Fastness—Test #2A-AATCC Test Method 61-1972.

Sublimation Test—AATCC Test Method 117-1973.

Perspiration—Test specimens were evaluated for resistance to acids by AATCC Test Method 15-1973.

Crocking—AATCC Test Method 8-1972.

Ozone fading—AATCC Test Method 109-1975.

The results are tabulated below. The table gives numerical values to the tests described above, using the usual AATCC numerical ratings running from 5 to 1; in which 5 represents no or negligible change, 4 represents a slight change, 3 represents a noticeable change and 1 represents must change.

TABLE I

| LIght | |
|---|---|
| Fade-O-Meter | (4 at 120 hours) |
| Xenon | (3–4 at 120 hours) |

| | #2A Wash | Perspiration Acid |
|---|---|---|
| Alteration | 4–5 | 4–5 |
| Staining | | |
| Acetate | 5 | 5 |
| Cotton | 5 | 5 |
| Nylon | 4–5 | 5 |
| Dacron (Polyester) | 5 | 5 |
| Wool | 5 | 5 |
| Orlon | 5 | 5 |
| Crock Test | | |
| Wet | –5 | |
| Dry | –5 | |
| Sublimation | | |
| 340°/30" | –4–5 | |

TABLE I-continued

| | |
|---|---|
| 385°/15" | −4 |
| Ozone fade 2 cycles | −3 |

In transfer printing a multi-ply sandwich of polyester fabric for 30" at 400° F.; relatively little color was developed on either the face and on the back of the second ply; and just a trace of color on the face of the 3rd ply and no color appears on the back of the 3rd ply.

EXAMPLE 3

Replacement of the 1—(4-chlorophenyl)-3-methyl-5-pyrazolone in the process of Example 1 with an equimolar amount of 1-(2-chlorophenyl)-3-methyl-5-pyrazolone gave a yellow compound having properties similar to that of Example 1 and having the structure:

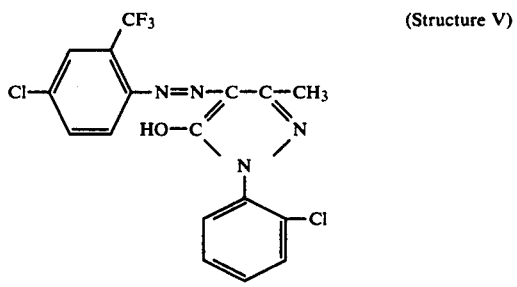

(Structure V)

EXAMPLE 4

Replacement of the 1-(4-chlorophenyl)-3-methyl-5-pyrazolone in the process of Example 1 with an equimolar amount of 1-phenyl-3-methyl-5-pyrazolone gave a yellow compound having properties similar to that of Example 1 and having the structure:

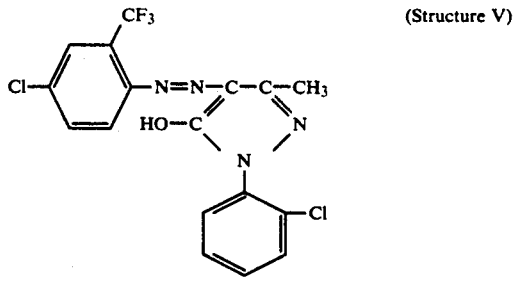

(Structure V)

EXAMPLE 5

Replacement of the 1-(4-chlorophenyl)-3-methyl-5-pyrazolone in the process of Example 1 with an equimolar amount of 1-(2,5-dichlorophenyl)-3-methyl-5-pyrazolone gave a yellow compound having properties similar to that of Example 1 and having the structure:

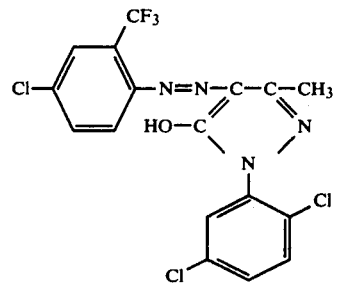

(Structure VII)

Although the application is primarily directed to the transfer printing of polyester textiles, the invention also comprehends heat transfer printing onto any polyester or polyester coated substrate (herein sometimes collectively referred to as "polyester substrates").

I claim:

1. A compound of the formula

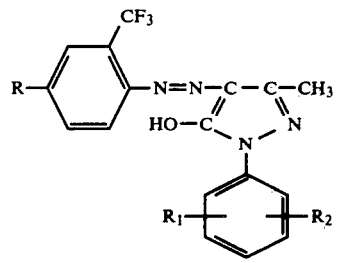

where R is halogen, and $R_1$ and $R_2$ independently of one another are hydrogen, lower alkyl or halogen.

2. A compound according to claim 1 wherein R is chlorine and $R_1$ and $R_2$ are hydrogen.

3. A compound according to claim 1 where R is chlorine, $R_1$ is hydrogen and $R_2$ is chlorine positioned ortho to the nitrogen.

4. A compound according to claim 1 wherein R is chlorine, $R_1$ is hydrogen and $R_2$ is chlorine positioned para to the nitrogen.

5. A compound according to claim 1 wherein R, $R_1$ and $R_2$ are chlorine.

6. A compound according to claim 1 wherein the compound is ground to particle size less than 3 micron.

* * * * *

UNITED STATES PATENT AND TRADEMARK OFFICE
CERTIFICATE OF CORRECTION

PATENT NO. : 4,200,570
DATED : April 29, 1980
INVENTOR(S) : Russell I. Steiner

It is certified that error appears in the above—identified patent and that said Letters Patent is hereby corrected as shown below:

In the title on the cover sheet and on page 1, change "5" to --4--.
At column 1, line 23, in Structure I, after "N=N-C-C" add -- -CH$_3$ --.
At column 1, line 38, change "-5-halobenzotriflouride" to ---5-halobenzotrifluoride--.
At column 1, line 65, delete "1-(4-chloro-".
At column 1, line 66, amend the line to --1-(4-chlorophenyl)-3-methyl-5-pyrazolone,--.
At column 1, line 67, change "1(2,5-dichlorophenyl)3-methyl-5-pyrazolone and" to --1-(2,5-dichlorophenyl)-3-methyl-5-pyrazolone, and--.
At column 3, line 6, change "brightners" to --brighteners--.
At column, 3, line 12, change "posesses" to --possesses--.
At column 3, line 47, change "tratments" to --treatments--.
At column 4, line 11, delete the semicolon after "fabrics".
At column 5, line 18, change "1-(4 chlorophenyl)-3-methyl-5-pyrazolone" to --1-(4-chlorophenyl)-3-methyl-5-pyrazolone--.
At column 6, line 49, change "must" to --much--.

Signed and Sealed this

Twenty-ninth Day of July 1980

[SEAL]

Attest:

SIDNEY A. DIAMOND

Attesting Officer

Commissioner of Patents and Trademark